United States Patent [19]
Kasutani et al.

[11] Patent Number: 5,487,627
[45] Date of Patent: Jan. 30, 1996

[54] COUNTER SINK DRILL

[75] Inventors: Hiroshi Kasutani; Takao Koyama, both of Gifu; Kouji Hashimoto; Yutaka Adachi, both of Aichi, all of Japan

[73] Assignee: Mitsubishi Materials Corporation, Tokyo, Japan

[21] Appl. No.: 280,767

[22] Filed: Jul. 26, 1994

[51] Int. Cl.$^6$ ................................................... B23B 51/10
[52] U.S. Cl. .......................................... 408/145; 408/225
[58] Field of Search ............................ 408/145, 223–225

[56] References Cited

U.S. PATENT DOCUMENTS

| | | | |
|---|---|---|---|
| 2,978,846 | 4/1961 | Barron | 408/145 |
| 4,720,218 | 1/1988 | DeFries et al. | 408/145 |
| 5,052,153 | 10/1991 | Wiand | 408/145 |
| 5,123,217 | 6/1992 | Ishikawa et al. | 408/145 |
| 5,354,155 | 10/1994 | Adams | 408/145 |

FOREIGN PATENT DOCUMENTS

| | | | |
|---|---|---|---|
| 404310303 | 11/1992 | Japan | 408/145 |

*Primary Examiner*—Steven C. Bishop
*Attorney, Agent, or Firm*—Armstrong, Westerman, Hattori, McCleland & Naughton

[57] ABSTRACT

A cutter body for counter sink drilling fiber reinforced plastic materials, such cutter body having a pilot portion at a distal end of the cutter body and a countersinking section formed adjacent to the pilot portion in a region on the base end side of the cutter body. The countersinking section comprises three unit machining sections disposed with equal angular intervals in the circumferential direction of the cutter body. Each unit machining section comprises an abrasive layer formed by electrodepositing diamond abrasive grains on a conical surface in turn provided on the cutter body with a chip discharge groove and a finishing edge overhanging from the abrasive layer by an amount t and disposed in order successively rearward in the direction of rotation of a drill or cutter. The finishing edge is formed on a hard sinter, which contains diamond grains as a main ingredient, on a laminar sinter.

3 Claims, 3 Drawing Sheets

COUNTER SINK DRILL

FIELD OF THE INVENTION

The present invention relates to a counter sink drill for countersinking holes defined in, particularly, FRP (Fiber Reinforced Plastic) materials.

BACKGROUND OF THE INVENTION

Heretofore, one set of a roughing cutter, 1 as shown in FIG. 5, and a finishing cutter 2, as shown in FIG. 6, has been employed to countersink holes defined in FRP materials such as using CFRP, GFRP or KFRP. In such FIGS., reference character W denotes a workpiece which is made of any of the above FRP's and is to be machined, and H denotes a hole which is defined in the workpiece W and is to be countersunk.

In the roughing cutter 1 shown in FIG. 5, a cutter body 3 is attached to an air drilling tool, an electric-powered tool, or the like, for rotation about its axis O, and a pilot portion 4 is formed to project from a distal end of the cutter body 3 along the axis O. The pilot portion 4 has an outer diameter sized so that it may be inserted into the hole H defined in the workpiece W.

The cutter body 3 is provided, in a region closer to the base end than the pilot portion 4, with conical surfaces 5 flaring toward the base end side radially outwardly with respect to the axis O and the chip discharge grooves 6, radially recessed from the conical surfaces 5, such surfaces 5 and grooves 6 being alternately formed in the circumferential direction of the cutter body 3. Each of the conical surfaces 5 has an abrasive layer 7 formed thereon by electrodepositing diamond abrasive grains.

As with the above-described roughing cutter 1, the finishing cutter 2, shown in FIG. 6, includes a pilot portion 9 formed at a distal end of a cutter body 8, conical surfaces 10 and chip discharge grooves 11 formed in a region closer to the base end than the pilot portion 9.

Further, in the finishing cutter 2, a hard sinter 12, made of diamond as a main ingredient, and a hard metal 13 are laminated into a laminar sinter 14 in the form a fan-shaped flat plate. The laminar sinter 14 is brazed to a wall surface 11A of the chip discharge groove 11 and facing in the direction of rotation of the tool such that the hard sinter 12 faces in the direction of rotation of the tool. A finishing edge 15 is formed on the hard sinter 12 along a ridge where the wall surface 11A and the conical surface 10 join with each other.

When countersinking the hole H by the cutters 1, 2, the roughing cutter 1 is first attached to the air drilling tool, the electric-powered tool, or the like, not shown, followed by presetting, such as, adjustment of a depth by which the hole H is to be countersunk. Then, the axis O of the cutter body 3 is aligned with an axis of the hole H, and the cutter body 3 is rotated and fed into the hole H while being guided with the aid of the pilot portion 4. A part of the workpiece W, around the hole H, is gradually cut by the abrasive layers 7 formed on the conical surfaces 5. As a result, a roughly cut surface R in the form of a recessed conical surface diverging toward the center of the hole H, is formed.

After the roughing step, the roughing cutter 1 is removed from the air drilling tool, or the like, and the finishing cutter 2 is attached to the tool and presetting to the depth by which the hole is to be countersunk. Then, similarly to the above step, the cutter body 8 is rotated and fed into the hole H while being guided with the aid of the pilot portion 9. As a result, the roughly cut surface R is shaven by the finishing edge 15 to form a smooth finished surface F.

The countersinking by the use of roughing cutter 1 and the finishing cutter 2 comprises two steps, i.e., the roughing step and the finishing step. It is impossible to make a machining time required to complete the entire countersinking shorter than the total time necessary for the two machining steps. This has been one impediment to improvement in the machining efficiency. Further, when the machining is shifted from the roughing step to the finishing step, it is required to remove the roughing cutter 1 from the air drilling tool, or the like, attach the finishing cutter 2 to the tool, and preform the presetting such as adjustment of the depth by which the hole is to be countersunk, before starting the roughing step. This has inevitably resulted in longer machining time.

Also, because one cutter must be replaced with the other cutter upon shift from the roughing step to the finishing step, frequent replacement of the cutters has imposed a great deal of labor on an operator, particularly when there are many holes H to be countersunk. Additionally, the roughing cutter 1 and the finishing cutter 2 must be handled separately and the total number of cutters is increased, resulting in still another problem and making tool management complicated.

BRIEF DESCRIPTION OF THE INVENTION

The present invention has been made with a view of solving problems as described above, and provides a counter sink drill including a pilot portion disposed at a distal end of a cutter body, which is rotatable about the axis of the cutter body, and projects along such axis, and a countersinking section formed in a region adjacent to the pilot portion on the base end side, wherein the countersinking section comprises a roughing section formed of an abrasive layer provided on a conical surface which is, in turn, provided on the cutter body, a chip discharge groove recessed from the roughing section radially inwardly with respect to the axis, and a finishing edge which has a path of rotation about the axis aligned with that of the roughing section or which provides a conical surface positioned nearer to the distal end than the roughing section along the axis, the roughing section, the chip discharge groove and the finishing edge being each disposed in the circumferential direction of the cutter body.

In the counter sink drill constructed of the present invention, one cutter body is provided with a roughing section for roughing a workpiece, a finishing edge for finishing the roughened surface, and a chip discharge groove disposed in the circumferential direction of the cutter body. The finishing edge is set to have a path of rotation about the axis of the cutter body aligned with that of the roughing section, or to provide a conical surface positioned nearer to the distal end than the roughing section along the axis. By feeding the cutter body along the axis while such cutter body is rotating, the surface which has been cut by the roughing section is then shaven by the finishing edge positioned rearwardly of the roughing section in the direction of rotation of the tool. The surface which has been shaven by the finishing edge is then further cut by the roughing section positioned rearwardly of the roughing section in the direction of rotation of the tool. In this way, the surface to be machined is gradually cut by the roughing section and the finishing edge alternately, whereby countersinking is progressed. At the time the workpiece is countersunk to a predetermined depth, the feed of the cutter body is stopped. In this condition where the cutter body is not fed, because the workpiece is cut by only the finishing edge in the present counter sink drill, the machined surface which has been cut through the process described above is finally shaven by the finishing edge so as to form a smooth finished surface.

Thus, with the counter sink drill constructed as above, both the roughing and the finishing can be simultaneously preformed by one cutter through one countersinking step. Accordingly, the machining time can be shortened to a large extent, and replacement of the cutters upon each shift from the roughing step to the finishing step is no longer required, making it possible to reduce the labor imposed on an operator and simplify tool management.

Fine powdery chips are produced during the machining by the roughing section as the workpiece is cut by the abrasive layer. On the other hand, during the machining by the finishing edge, relatively large chips are produced as the workpiece is shaven by the finishing edge. To promote satisfactory discharge of such relatively large chips, therefore, it is desired that the chip discharge groove 27 be disposed forwardly of the finishing edge in the direction of rotation of the tool, i.e., that the roughing section, the chip discharge groove and the finishing edge are disposed successively in this order from the forward to rearward side in the direction of rotation of the cutter body to make up one unit machining section. One or more unit machining sections are disposed in the circumferential direction of the cutter body and make up the countersinking section.

Furthermore, particularly when countersinking any type of FRP materials mentioned before, it is desired that the roughing section be formed of an abrasive layer made by electrodepositing diamond abrasive grains, and finishing edge be formed on a hard sinter containing diamond as a main ingredient.

BRIEF DESCRIPTION OF THE DRAWINGS

The present invention will be more particularly described and will be better understood from the following description taken with the appended drawings in which.

DETAILED DESCRIPTION OF THE PREFERRED EMBODIMENTS

Figure 1:
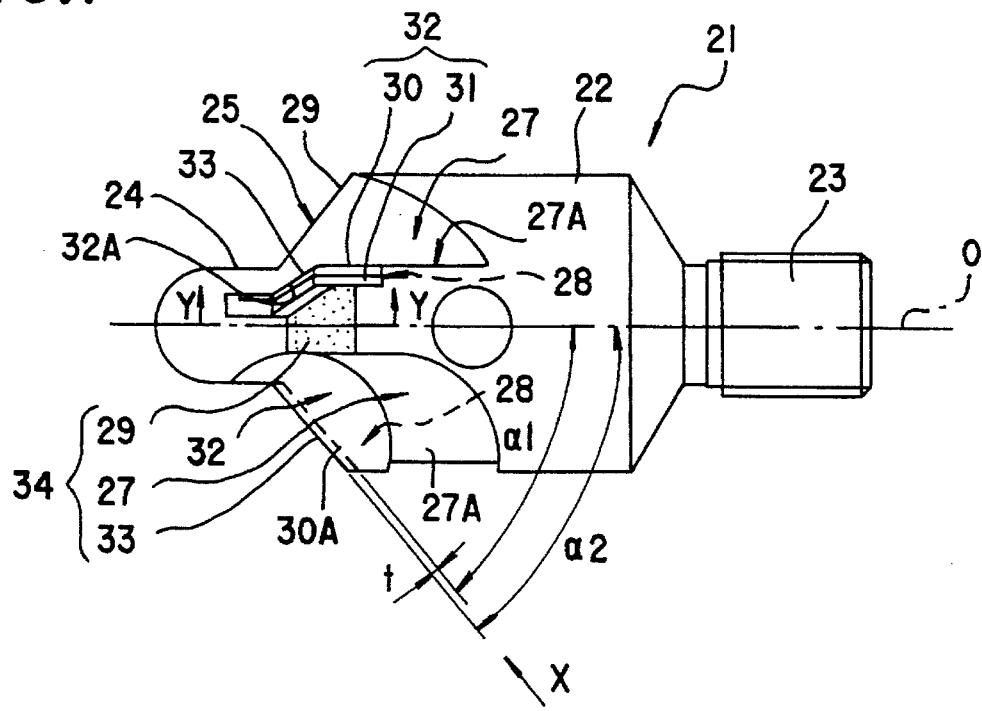
FIG. 1 is a side view showing one embodiment of the present invention.
Figure 2:
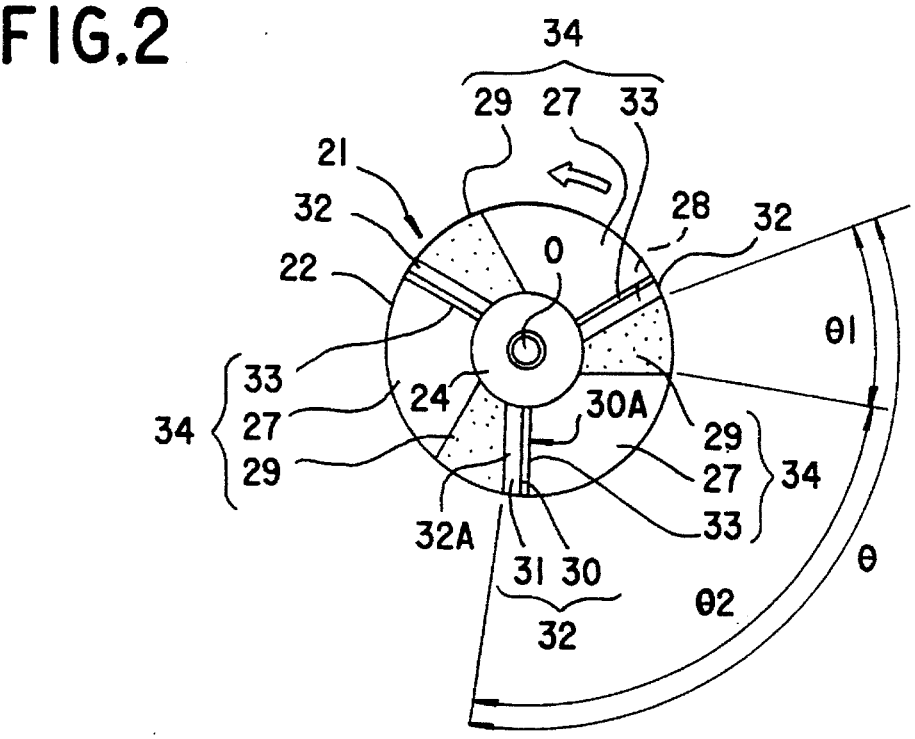
FIG. 2 is a front view of the embodiment shown in FIG. 1 as viewed from the distal end side along an axis O.

In FIGS. 1 and 2, a cutter body 21 has a generally cylindrical barrel 22 provided, on its base end side (on the right side as viewed in FIG. 1), with a threaded portion 23 for attachment to an air drilling tool, an electric-powered tool, or the like.

A cylindrical pilot portion 24 having a smaller diameter than the barrel 22 projects from a distal end of cutter body 21 along an axis O of cutter body 21. The pilot portion 24 has an outer diameter sized to be substantially equal to, or slightly smaller than an inner diameter of a hole to be countersunk, so that pilot portion 24 can be inserted into the hole. Pilot portion 24 has a distal end formed into a spherical shape and smoothly joining with the outer circumferential surface of pilot portion 24.

A base end of the pilot portion 24 and the barrel 22 of cutter body 21 are connected by a conical surface 25 having a center or axial line aligned with the axis of the cutter body 21 and flared toward the base end side radially outwardly with respect to the axis O.

Figure 4:
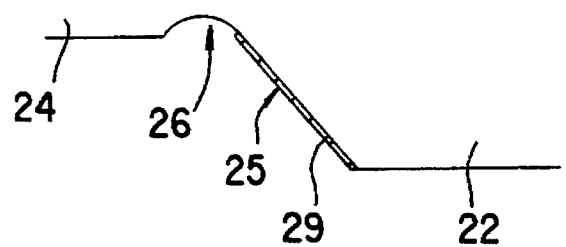
FIG. 4 is an enlarged sectional view of the embodiment shown in FIG. 1 taken along line Y—Y.
Figure 5:
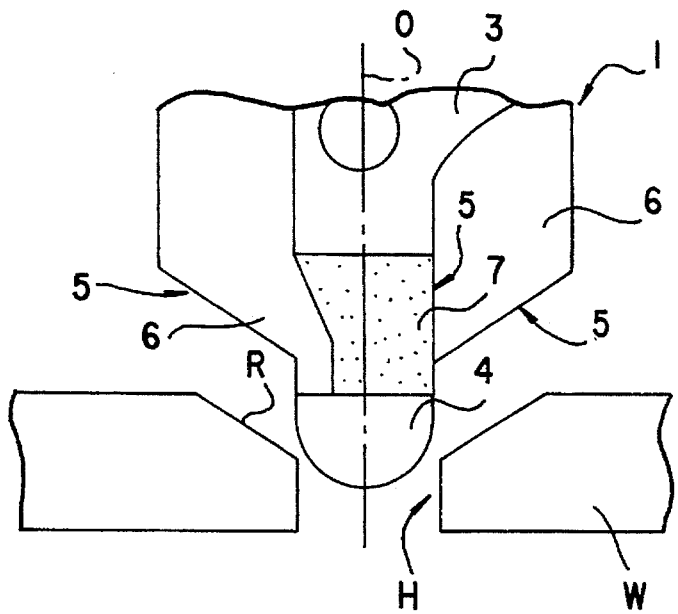
FIG. 5 is a view showing a roughing cutter 1 in the prior art.
Figure 6:
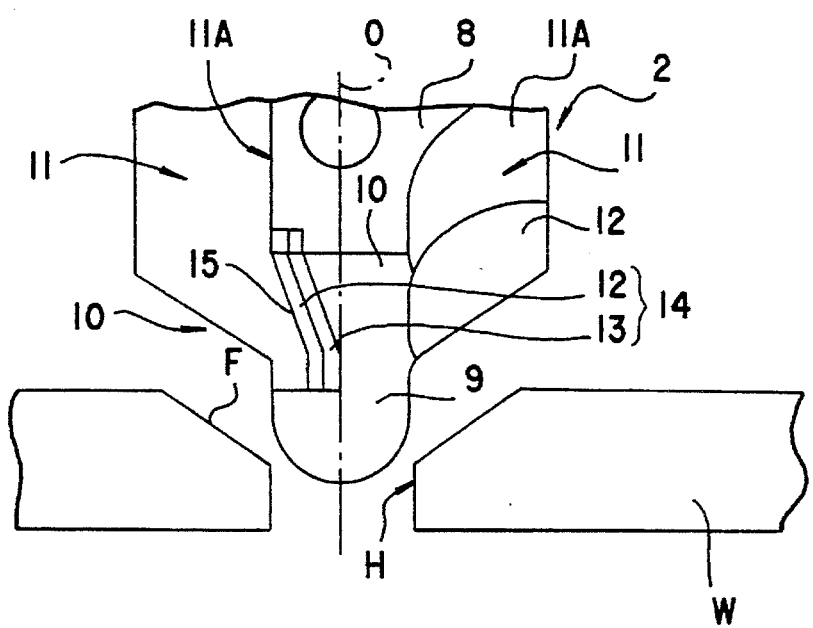
FIG. 6 is a view showing a finishing cutter 2 in the prior art.

An angle $\alpha_1$ at which the generatrix of the conical surface 25 crosses the axis O is set depending on a taper of the cut surface formed by such conical surface. In a region where the conical surface 25 and the outer circumferential surface of the pilot portion 24 join with each other, as shown in FIG. 4, a narrow part 26, radially inwardly recessed, is formed in the circumferential direction of the pilot portion 24.

In a region of the cutter body 21, spanning from the base end of the pilot portion 24 to almost the center of the barrel 22, there is formed a chip discharge groove 27 which is open to the outer circumferential surface of the pilot portion 24, the conical surface 25 and the outer circumferential surface of the barrel 22, and which is recessed radially inwardly from such surfaces.

The illustrated embodiment includes three chip discharge grooves 27 formed at equal angular intervals in the circumferential direction of the cutter body 21 and are set to be equal to each other not only in groove shape but also in circumferential width. A wall surface 27A of each of the chip discharge grooves 27 facing in the direction of rotation of the drill or cutter (i.e., in the counterclockwise direction in FIG. 2) is formed in a direction containing the axis O. In a distal end region of the wall surface 27A, there is formed a recess 28 having a generally fan shape in a plan view which is stepwisely recessed from the wall surface 27A rearward in the direction of rotation of the drill, and which is open to the wall surface 27A, the conical surface 25 and the outer circumferential surface of the barrel 22 at its distal end.

Further, in the illustrated embodiment, each of three conical surfaces 25 divided by the chip discharge grooves 27 and the recesses 28 in the circumferential direction has an abrasive layer 29 which is substantially uniform thick and is formed thereon by electrodepositing diamond abrasive grains. Roughing sections of the counter sink drill of this embodiment are thereby constructed. The abrasive layer 29 is formed by electrodeposition in a region of each conical surface 25 extending from the narrow part 26 toward the base end side.

In this embodiment, the grain size of diamond abrasive grains, making up the abrasive layer 29, is appropriately set in the range of #80 to #600. If the grain size is larger than the above range, there would arise a fear that the resistance during machining may be too increased. Conversely, if the grain size is smaller than the above range, clogging and dislodgement of the abrasive grains would be more likely to occur. Furthermore, it would be meaningless to employ an abrasive layer with a grain size so small for cutting a surface which is finally finished by a finishing edge.

On the recess 28, formed in the wall surface 27A of the chip discharge groove 27, a hard sinter 30 made of diamond grain as a main ingredient and a hard metal 31 are laminated and sintered together into a laminar sinter 32 in the form of a fan-shaped flat plate. The laminar sinter 32 is fixed to the recess 28 by brazing with the hard sinter 30 facing in the direction of rotation. The laminar sinter 32 has a thickness set to be substantially equal to the depth of the recess 28 so that a surface 30A of the hard sinter 30, facing in the direction of rotation, joins with the wall surface 27A in flush relation.

A surface 32A of the laminar sinter 32, facing the distal end side, is projected from the conical surface 25 toward the distal end side, and is formed into a sloped surface flaring toward the base end side, radially outwardly with respect to the axis O as with the conical surface 25.

Figure 3:
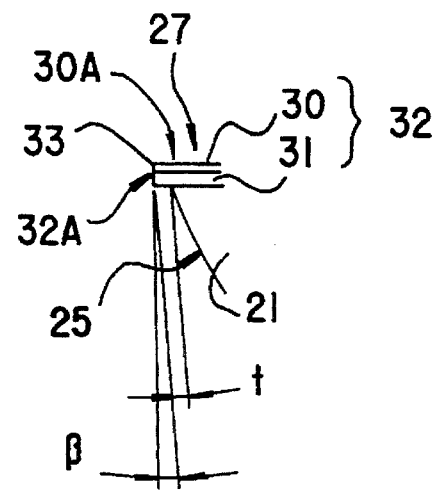
FIG. 3 is a view of the embodiment shown in FIG. 1 as viewed in the direction of arrow X.

A finishing edge 33 is formed along a ridge where the surface 32A facing the distal end side and the surface 30A facing in the direction of rotation join with each other. An angle $\alpha_2$ at which the finishing edge 33 is inclined with respect to the axis O is set to be equal to the angle $\alpha_1$ at which the generatrix of the conical surface 25 crosses the axis O. In other words, the finishing edge 33 is formed in a direction parallel to the generatrix of the conical surface 25. The distance between the finishing edge 33 and the generatrix of the conical surface 25, i.e., the amount t by which the finishing edge 33 is overhung from the abrasive layer 29 (see FIG. 3), is set to 0.03 mm in this embodiment.

Further, the finishing edge 33 has an angle $\beta$ of relief imparted to the surface 32A facing the distal end side. The angle $\beta$ of relief is set to 10° in this embodiment.

Thus, in the counter sink drill of this embodiment, the abrasive layer 29 (roughing section), the chip discharge groove 27 and the finishing edge 33 are disposed successively in this order from the forward to rearward side in the direction of rotation, as shown in FIG. 2, thereby making up one unit machining section 34.

A total of three unit machining sections 34 are disposed with equal angular intervals in the circumferential direction of the cutter body 1, to thereby make up a countersinking section in this embodiment. Accordingly, an angle $\Theta$ which is covered by one unit machining section 34 in the circumferential direction of the cutter body 1 in a front view, i.e., as viewed from the distal end of the counter sink drill along the axis O, FIG. 2, is 120° in this embodiment. Also in the front view, an angle $\Theta_1$ which is covered by the abrasive layer 29 in one unit machining section 34 is set to 30°, and an angle $\Theta_2$ which is covered by the chip discharge groove 27 and the finishing edge 33 therein is set to 90°. Thus, an angle ratio $\Theta_1:\Theta_2$ of the former to the latter is set to 1:3 in this embodiment.

The counter sink drill constructed, as above, is operated as follows. As with the roughing cutter 1 and the finishing cutter 2 in the foregoing prior art, the cutter body 21 is attached at the threaded portion 23 to an air drilling tool, an electric-powered tool or the like, followed by presetting such as adjustment of a depth by which the hole is to be countersunk. Then, the axis O of the cutter body 21 is aligned with an axis of the hole H, and the cutter body 21 is rotated about the axis O and fed into the hole while being guided with the aid of the pilot portion 24, whereby the hole is countersunk.

In the above process, the countersinking section functions as follows. With one unit machining section 34, the abrasive layer 29 as the roughing section first cuts a part of the workpiece around the hole to form a roughly cut surface. Then, the finishing edge 33, successively disposed rearwardly of the abrasive layer 29 in the direction of rotation of the drill, shaves the roughly cut surface. Chips produced by the finishing edge 33 are introduced to the chip discharge groove 27 positioned forwardly of the finishing edge 33, and are then discharged from the groove 27.

Further, the machined surface, shaven by the finishing edge 33, is cut again by the abrasive layer 29 of another one unit machining section 34 positioned rearwardly of the above one unit machining section 34 in the direction of rotation of the drill. Subsequently, with the continued feed of the cutter body 21, the machined surface is cut by the abrasive layers 29 and the finishing edge 33, alternately, to progress the countersinking.

At the time the cutter body 21 is fed to reach a predetermined depth of the countersink, the feed of the cutter body is stopped. In this condition, because the finishing edge 33 is projected from the abrasive layer 29 toward the distal end side along the axis O in each of the unit machining sections 34 of the countersinking section, the machined surface is cut by only the finishing edges 33 so as to form a smooth finished surface.

With the counter sink drill of this embodiment, both the roughing and the finishing can be simultaneously performed by one cutter through one countersinking step. In other words, the countersinking that has, heretofore, been performed in two separate steps is performed in one step. It is therefore possible to omit replacement of the cutters and adjustment of the depth by which the hole is to be countersunk, which have been indispensable upon each shift from the roughing step to the finishing step in the prior art apparatus. As a result, the machining time required for countersinking can be shortened to a large extent and hence the machining efficiency can be improved.

Because of no need of replacement of the cutters upon each shift from the roughing step to the finishing step and adjustment of the depth by which the hole is to be countersunk upon each replacement of the cutters, it is possible to reduce the labor imposed on an operator. Further, while two kinds of cutters, i.e., the roughing cutter 1 and the finishing cutter 2, have been required in the prior art, this invention employs only one kind of cutter, resulting in simplified tool management.

In addition, with the counter sink drill constructed as above, the tool life can be prolonged. More specifically, while the abrasive layer 7 of the roughing cutter 1 and the finishing edge 15 of the finishing cutter 2 are employed to cut the workpiece in separate steps to form the machined surface in the prior art, the abrasive layer 29 and the finishing edge 33 cut the workpiece alternately to form the machined surface in the instant invention. Therefore, the load imposed on each of the abrasive layer 29 and the finishing edge 33 during the process of countersinking can be reduced down to about ½ of the load imposed on each of the abrasive layer 7 and the finishing edge 15 in prior art. From reversely proportional relation, the tool life can be prolonged about twice.

Particularly when a large number of holes are countersunk, wears of the abrasive layers 29 and the finishing edges 33 are slowed to reduce the frequency at which tools are to be replaced. This enables, in combination with the above advantage, the machining efficiency to be further improved.

Taking as one example a machining step of countersinking 100 holes defined in an FRP material, the net machining time required to countersink one hole was a total of 3 minutes in the prior art employing the roughing cutter 1 and the finishing cutter 2; i.e., 2 minutes for cutting by the roughing cutter 1 and 1 minute for shaving by the finishing cutter 2. In contrast, it was shortened to 1.7 minutes by employing the counter sink drill of this invention. At this time, the rotational speed of the cutter bodies 3, 8, 21 was 2800 rpm.

Also, while the roughing cutter 1 and the finishing cutter 2 of the prior art each came to the end of life in 40 holes, the life of the counter sink drill of the instant invention was prolonged to 80 holes. In other words, while the prior art requires six times of tool replacement for both the cutters 1, 2 to countersink the 100 holes, including initial attachment of both the cutters, the tool of the instant invention requires only two times of tool replacement.

In the above example, because the time necessary for replacement of one cutter, including the adjustment of the depth by which the hole is to be countersunk, in the prior art, was 20 minutes for any cutter, the total machining time required to countersink the 100 holes was 420 minutes=7 hours in the prior art; i.e., 200 minutes for the net roughing and 100 minutes for the net finishing, plus 120 minutes for total six times of tool replacement.

The total machining time required in the cutter of the instant invention was 210 minutes=3.5 hours; i.e., 170 minutes for the net machining plus 40 minutes for the tool replacement. Thus, the 100 holes could be countersunk with the cutter of the instant invention in half the time necessary for the prior art.

Furthermore, while the prior art requires a total of six cutters, i.e., three for each of the cutters 1, 2, for countersinking the 100 holes, the instant invention requires only two cutters.

In addition to such an improvement in the machining efficiency, even when burrs are caused in the machined surface during shaving by the finishing edge 33, the burrs can be cut in the counter sink drill constructed, as above, by the abrasive layer 29 positioned rearwardly of the finishing edge 33 in the direction of rotation of the drill. This leads to another advantage that such burrs can be easily removed and the countersunk holes with a higher degree of quality can be formed.

With the counter sink drill of this embodiment, because each of the unit machining sections 34 of the countersinking section comprises the abrasive layer 29, the chip discharge groove 27 and the finishing edge 33 disposed successively in this order from the forward to rearward side in the direction of rotation of the drill, relatively large chips produced by the finishing edge 33 are introduced to the chip discharge groove 27 and are then discharged from the groove 27, thereby ensuring smooth countersinking.

Also, because the abrasive layer 29 is formed by electrodepositing diamond abrasive grains and the finishing edge 33 is formed on the hard sinter 30 made of diamond as a main ingredient, good machining ability can be provided, particularly even when the workpiece to be machined is any type of FRP materials mentioned before.

In the counter sink drill of this invention, the finishing edge 33 is positioned nearer to the distal end than the abrasive layer 29 along the axis O, and the cutter body 21 is fed while being rotated so that the workpiece may be cut alternately by the abrasive layer 29 and the finishing edge 33. Conversely, if the finishing edge 33 is positioned nearer to the distal end than the abrasive layer 29 along the axis O, the finishing edge 33 could not cut the workpiece and hence the machining mode could not be realized.

Therefore, the finishing edge 33 must be arranged such the path of its rotation about the axis O is at least aligned with the abrasive layer 29 or positioned nearer to the distal end than the abrasive layer 29 along the axis O.

To maintain good balance between roughing by the abrasive layer 29 and finishing by the finishing edge 33 in the counter sink drill constructed as above, such parameters as the rotational speed and the feed of the cutter body 21, the amount t by which the finishing edge 33 is overhung from the abrasive layer 29, and the angle ratio $\Theta_1:\Theta_2$ of the angle $\Theta_1$ covered by the abrasive layer 29 in one unit machining section 34 to the angle $\Theta_2$ covered by the chip discharge groove 27 and the finishing edge 33 therein must be set appropriately.

For example, in the case where the countersinking section comprises the three unit machining sections 34, as in the illustrated embodiment, the amount t of the overhang is preferably set to be not greater than 1/20 of the diameter of the hole to be countersunk, or not greater than 0.3 mm in terms of practical value. It is desired that the angle ratio $\Theta_1:\Theta_2$ is in the range of 1:1 to 1:5.

As to the number of the finishing edges 33, the three finishing edges 33 are disposed with equal angular intervals in the circumferential direction of the cutter body 21 in the illustrated embodiment so as to provide more balanced machining than would be, for example, the case where only one machining edge 33 is disposed in the countersinking section. However, the present invention is not limited to such an arrangement, and the abrasive layer 29, as the roughing section, the chip discharge groove 27 and the finishing edge 33 may be each disposed in any desired number, i.e., at least one or more. However, in order to maintain the well balanced machining as mentioned above, the number of the finishing edges 33 is preferably set to be not greater than 8, depending on the size of the cutter body 21.

While, in the illustrated embodiment, the unit machining section 34 comprises the abrasive layer 29, the chip discharge groove 27 and the finishing edge 33 disposed successively in this order rearward in the direction of rotation of the drill, such an arrangement is not always required. For example, the finishing edge 33 may be sandwiched between the two abrasive layers 29, 29 in the circumferential direction, or another chip discharge groove 27 may be interposed between the finishing edge 33 and the abrasive layer 29 disposed successively.

Further, while the abrasive layer 29 is evenly formed on the conical surface 25 in the illustrated embodiment, a slit may be formed in the abrasive layer 29 to extend radially of the cutter body 21 for prevention of clogging.

According to the present invention, as described above, because the surface, cut by the preceding abrasive layer formed in the roughing section is then cut by the succeeding finishing edge, it is possible to simultaneously carry out roughing and finishing by one cutter through one machining step. Also, because replacement of the cutters, indispensable in the prior art in shift from the roughing step to the finishing step, is omitted in the instant invention, the machining time required for countersinking can be shortened to a large extent and machining efficiency improved.

Because, in the present invention, the workpiece is machined by the roughing section and the finishing cutter, alternately, the load imposed on each of the roughing section and the finishing edge, as in the prior art, can be reduced and the tool life prolonged.

Additionally, no need of replacement of the cutters for countersinking results in advantages of reducing the labor imposed on the operator, improving quality of the finished surface and simplifying the tool management.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:

1. A counter sink drill including a pilot portion disposed at a distal end of a cutter body rotatable about its axis, said distal end projecting along said axis, and a countersinking section adjacent said pilot portion on a base end of said cutter body, said countersinking section comprising a roughing section formed of an abrasive layer on a conical surface on said cutter body, a chip discharge groove recessed from said roughing section radially inwardly with respect to said axis, and a finishing edge having a path of rotation about said axis and aligned with said roughing section along said axis, at least one of said roughing section, said chip discharge groove and said finishing edge being disposed in the circumferential direction of said cutter body.

2. A counter sink drill according to claim 1, wherein said roughing section, said chip discharge groove and said finishing edge are disposed successively in such order from the forward to the rearward side in the direction of rotation of said cutter body to make up one unit machining section, and said countersinking section comprising one or more of said unit machining section disposed in said direction of rotation of said cutter.

3. A counter sink drill according to claim 2, wherein said roughing section is formed of an abrasive layer made by electrodepositing diamond abrasive grains, and said finishing edge is formed on a hard sinter containing diamond grains as a main ingredient.

* * * * *